US006805153B2

(12) United States Patent
Vermette et al.

(10) Patent No.: US 6,805,153 B2
(45) Date of Patent: Oct. 19, 2004

(54) HOSE CONNECTOR TEMPLATE APPARATUS

(75) Inventors: Raymond Blaine Vermette, Regina (CA); Tom O'Connell, Regina (CA); Jim Ried, Regina (CA)

(73) Assignee: General Electric Company, Schenectady, NY (US)

( * ) Notice: Subject to any disclaimer, the term of this patent is extended or adjusted under 35 U.S.C. 154(b) by 151 days.

(21) Appl. No.: 09/962,571

(22) Filed: Sep. 25, 2001

(65) Prior Publication Data

US 2003/0060733 A1 Mar. 27, 2003

(51) Int. Cl.[7] ............................................... B61D 5/00
(52) U.S. Cl. ....................... 137/350; 137/347; 105/358
(58) Field of Search ................... 137/347, 350, 137/15.04, 15.05; 105/358

(56) References Cited

U.S. PATENT DOCUMENTS

| | | | |
|---|---|---|---|
| 1,156,469 A | * 10/1915 | Dodge | ........................ 137/347 |
| 3,290,763 A | 12/1966 | Zahuranec et al. | ........... 29/157 |
| 3,740,825 A | 6/1973 | Buyken et al. | ................ 29/433 |
| 4,542,764 A | * 9/1985 | Brittingham et al. | ........ 137/347 |
| 5,071,172 A | * 12/1991 | Gross | ...................... 285/124.4 |
| 5,430,922 A | 7/1995 | Church et al. | ................. 29/407 |
| 6,227,223 B1 | 5/2001 | Crochet et al. | ........... 137/15.16 |
| 6,543,116 B1 | * 4/2003 | Vermette et al. | ........... 29/407.1 |

* cited by examiner

Primary Examiner—A. Michael Chambers
(74) Attorney, Agent, or Firm—McDermott Will & Emery LLP

(57) ABSTRACT

The present invention relates to an apparatus for restricting access to ports that may be disposed in a bonnet to house valves on a railcar. More specifically, the present invention relates to a template that may be lowered over the bonnet of the railcar wherein the template has a plurality of differently sized holes to allow access to specially-sized nozzles. In addition, the valves may be eduction valves and/or vapor valves, and the apertures may allow a specific-sized nozzle to have access to the eduction valves, the vapor valves or both. The template may lower onto the bonnet via a frame that may be rotatably attached to a structure. Further, joints and bearings may be provided to allow the template to be movable so as to precisely fit over the bonnet of the railcar.

25 Claims, 5 Drawing Sheets

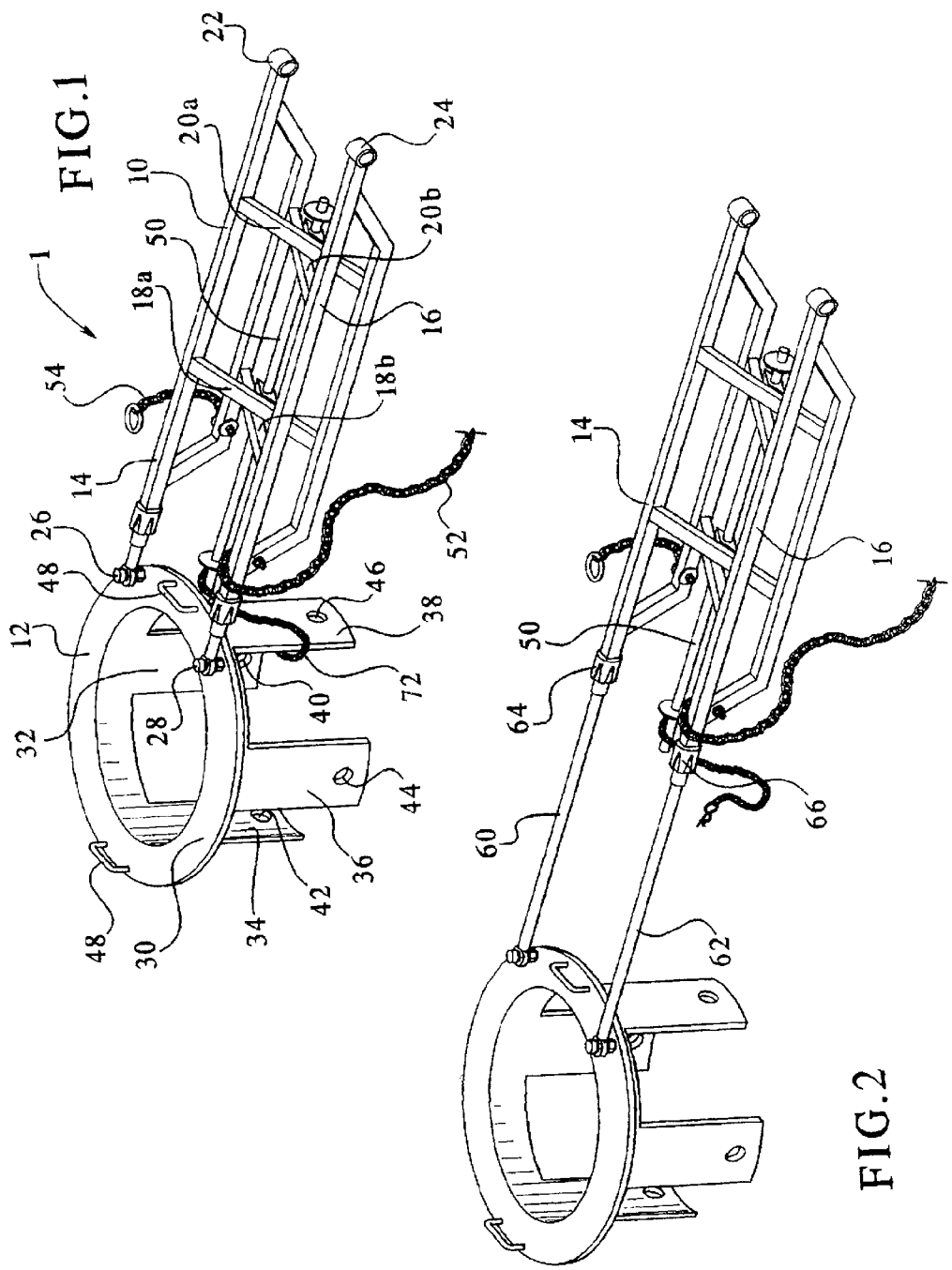

HOSE CONNECTOR TEMPLATE APPARATUS

FIELD OF THE INVENTION

The present invention relates to a hose connector template. More specifically, the present invention relates to a template that lowers onto a rail tank car bonnet or protective housing. The template may have a plurality of apertures for connecting particular types of hoses thereto. The apertures may be coded so that the correct hoses are attached to the proper apertures to ensure that the correct hoses are in alignment with valves that are disposed within the bonnet or protective housing. The template may be lowered and raised over the bonnet or protective housing via a lifting means such as a hydraulic apparatus or any other lifting mechanism.

BACKGROUND OF THE INVENTION

It is, of course, generally known to utilize rail tank cars, or other like mobile containers, to transport chemicals, such as, for example, hazardous, flammable or otherwise dangerous chemicals or other materials or commodities. The rail tank cars may transport these commodities via railways. Moreover, other like containers may utilize roadways, highways or other like thoroughfares to transport these commodities. The commodities stored within the rail tank cars or other like mobile containers must be added and removed at certain locations. For example, an empty rail tank car may be filled at one station and may be emptied at another station after the commodity has been delivered. Moreover, the rail tank cars or other like containers may be cleaned and/or repaired at cleaning and/or repair stations.

Whether the rail tank car must be filled, emptied, and cleaned and/or repaired, commodity must flow through one or more valves that may be disposed on the rail tank car. The rail tank car or other like mobile container may have a plurality of valves for the addition and/or removal of commodity for filling or removing the commodity. Further, the plurality of valves may be utilized to clean the rail tank car or other like mobile container by injecting the rail tank car with a cleaning substance such as, for example, steam, heated nitrogen gas, or any other substance that may be utilized to clean the rail tank car or otherwise empty the rail tank car of the commodity. Typically, the rail tank cars have dedicated valves for the addition or removal of liquid commodities or gaseous commodities. For example, a liquid valve may be connected to a pipe that may enter the rail tank car and have a length that may reach the bottom of the rail tank car. This is advantageous for the removal of liquid product, since gravity will pull liquid product to the bottom of the rail tank car. Moreover, a vapor valve may be connected to a pipe that may enter the rail tank car and have a length that may only reach the headspace of the rail tank car thereby allowing the addition or removal of gaseous materials. Various pipes or lines may be attached to these valves for the addition or removal of material from the rail tank car or other like container.

Moreover, a typical cleaning process for the rail tank car or other like container may include, as noted above, a withdrawal of material via a vacuum pump and/or an injection of cleaning material, such as, for example, steam, heated nitrogen gas, air or other material, that will clean the inside of the rail tank car or other like container, and remove most, if not all, of the commodity contained therein. A vacuum pump may be utilized to withdraw an amount of heated nitrogen gas that had been injected into the railcar. The heated nitrogen gas may combine with the gaseous chemical and be pulled from the rail car by the vacuum pump. The nitrogen gas/chemical mixture may then be injected into a means for disposing of the chemical, such as via a flare tower for incinerating the chemical, or a reaction tank for neutralizing the chemical.

The cleaning systems, as described above, typically have a plurality of hoses, pipes or lines that may connect, for example, to the plurality of valves contained on a rail tank car. Typically, the plurality of valves are contained within a housing having a cover that may protect the valves therein. Moreover, there are typically two eduction, or liquid, valves, and two vapor valves. However, the housing or bonnet may contain any number and type of valves as may be apparent to one having ordinary skill in the art. The cleaning systems described above will typically include a hose that will connect to one of the valves for the addition of the steam, nitrogen gas, or other gas that will clean the rail tank car. The addition of steam or heated nitrogen gas is typically added to one of the eduction, or liquid valves, so that the steam may enter the rail tank car at the bottom of the rail tank car thereby travelling within the rail tank car to maximize the vaporization of the chemical contained therein. Another hose or other hoses may be attached to one or more of the vapor valves for removing the steam or nitrogen and chemical mixture to be disposed of. The pipes may be attached to the valves on the rail tank car at the same time so that the injection and removal of the steam, nitrogen, or other gas and subsequent removal thereof may be done quickly and, perhaps, automatically.

However, it is very important that these hoses or pipes be connected to the rail tank car in the proper arrangement. Improperly connected hoses can result in damage to the equipment and can endanger the health and safety of people who may be around the rail tank car when the hoses are connected and utilized. Moreover, the commodity may escape to the environment, further endangering the health of safety of people. For example, the hoses may be connected to the wrong valves so that when the steam or nitrogen gas is added to the rail tank car, the wrong valve may be opened, thereby causing a damaging increase in pressure of the steam or nitrogen gas within the cleaning system. Moreover, the vacuum pump may be activated without the proper valve being opened from the rail tank car to the vacuum, thereby causing damage to the cleaning system.

A need, therefore, exists for an apparatus and a method for connecting hoses that overcomes the problems noted above. More specifically, an apparatus and a method are necessary for ensuring the proper connection of hoses from a filling, emptying and/or cleaning system that may be utilized to fill and/or remove commodity from the rail tank car or other like container, or to clean the same.

SUMMARY OF THE INVENTION

The present invention relates to a hose connector template. More specifically, the present invention relates to a template that lowers onto a rail tank car bonnet or protective housing. The template may have a plurality of apertures for connecting particular types of hoses thereto. The apertures may be coded so that the correct hoses are attached to the proper apertures to ensure that the hoses are in alignment with valves that are disposed within the bonnet or protective housing. The template may be lowered and raised over the bonnet or protective housing via a lifting means such as a hydraulic apparatus or any other lifting mechanism.

To this end, in an embodiment of the present invention, an apparatus is provided for connecting hoses to valves on a railcar. The railcar comprises a template comprising a plurality of apertures wherein the apertures have sizes to restrict the attachment of hoses to the valves on the railcar.

The apparatus further comprises a frame pivotally attached to a structure wherein the template is connected to the frame.

The template comprises a ring having flanges wherein the apertures are disposed in the flanges.

The apparatus further comprises an extender connecting the frame to the template wherein the extenders allow the template to move away from the frame.

The frame may have at least one arm and further wherein the extender may be moveably connected to the arm of the frame.

The extender may be connected to the arm of the frame via a compression fitting that may tighten around the extender thereby restricting the movement of the extender when tightened.

At least one of the apertures is differently sized from the other apertures.

The valves are contained within a bonnet on the railcar and further wherein the template fits within the bonnet of the railcar.

The bonnet comprises a plurality of ports and further wherein the apertures in the template restrict access to the ports on the bonnet.

At least two of the apertures in the template are differently sized.

The frame is pivotally connected to the structure via rotatable joints.

The apparatus further comprises a locking bar attached to the frame wherein the locking bar connects to the template and restricts the movement of the template.

The frame is pivotally connected to the structure and the frame translates along the structure.

The apparatus further comprises means for lowering the template onto the bonnet of a railcar.

A first aperture of the template is a first size and a second aperture is a second size that is different from the first size.

At least one aperture on the template is sized to receive a nozzle that is about 1 inch in diameter and a second aperture is sized to receive a nozzle that is about 1¼ inches in diameter.

The bonnet comprises a plurality of types of valves.

The bonnet comprises at least one eduction valve and at least one vapor valve.

A first aperture of a first size restricts access through a first port to the eduction valve and further wherein a second aperture of a second size restricts access through a second port to the vapor valve.

It is, therefore, an advantage of the present invention to provide a hose connector template and a method of using the hose connector template that allows an individual to ensure that the proper hoses are attached to a plurality of valves that may be disposed on a rail tank car. The hose connector template further ensures that the proper valves will be opened and closed when a chemical within the rail tank car is being added or removed from the rail tank car.

Moreover, it is an advantage of the present invention to provide a hose connector template and a method of using the hose connector template that is simple to use and relatively inexpensive to construct. The hose connector template further protects the health and/or safety of workers or any other individual that may be around the rail tank car as the rail tank car is being filled, emptied, or cleaned.

Still further, it is an advantage of the present invention to provide a hose connector template and a method of using the hose connector template that allows the hose connector template to be utilized in a plurality of positions on a rail tank car. Specifically, the hose connector template may move laterally and longitudinally to precisely align with the valves of a rail tank car.

Additional features and advantages of the present invention are described in, and will be apparent from, the detailed description of the presently preferred embodiments and from the drawings.

BRIEF DESCRIPTION OF THE DRAWINGS

FIG. 1 illustrates a perspective view of a hose connector template in an embodiment of the present invention.

FIG. 2 illustrates a perspective view of a hose connector template that is extended in an embodiment of the present invention.

DETAILED DESCRIPTION OF THE PRESENTLY PREFERRED EMBODIMENTS

The present invention relates to a hose connector template that may be utilized to fit over or otherwise into a protective bonnet on a rail tank car. The template may ensure that hoses, pipes, lines, or other connecting means are attached correctly to one or more of a plurality of valves that may be contained within the protective bonnet. Moreover, a method of using the cross hose connector is disclosed.

Figure 4:
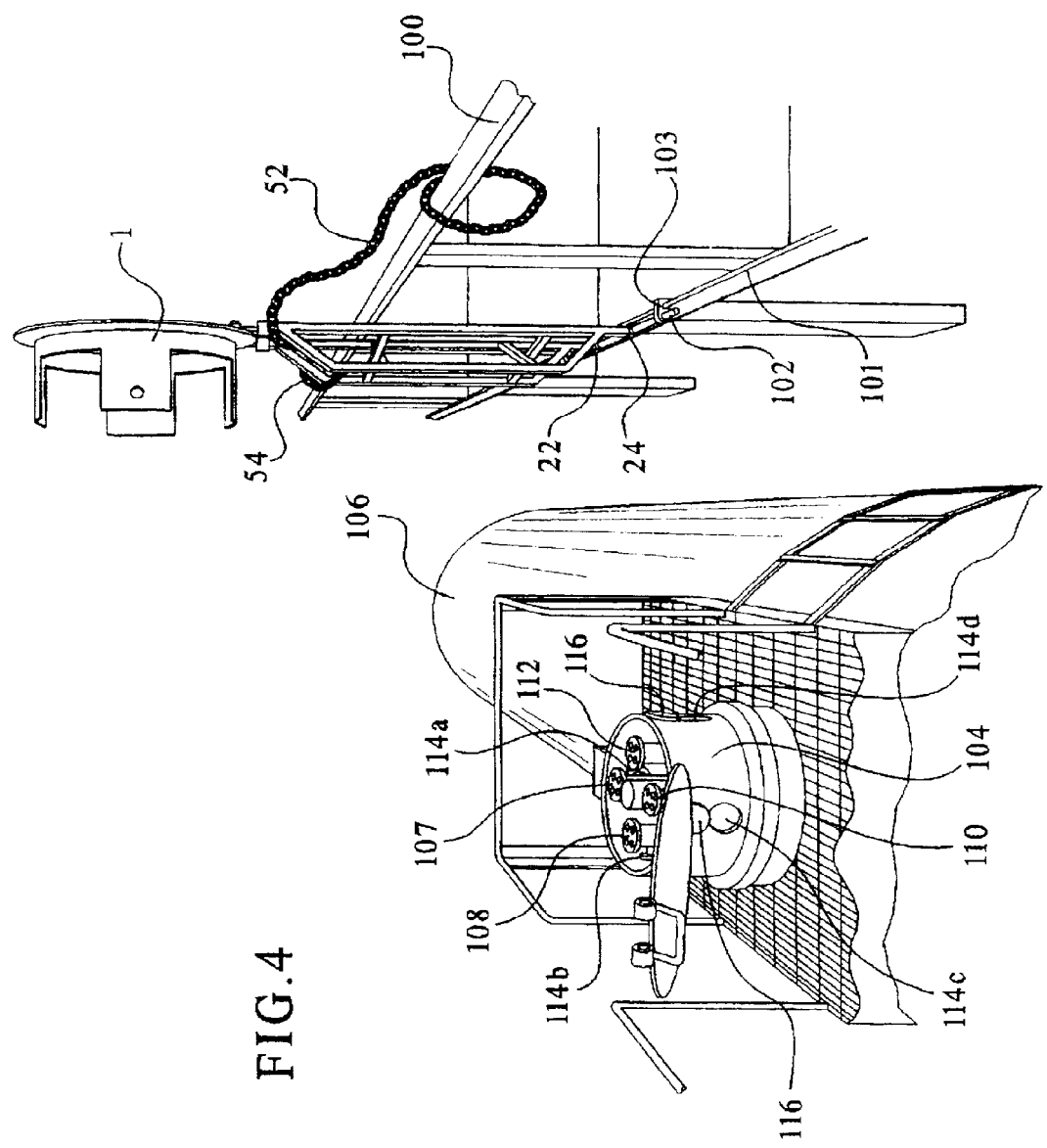
FIG. 4 illustrates a perspective view of the hose connector template disposed on a walkway and rotatable around a pivot point on the walkway for attachment to a rail tank car in an embodiment of the present invention.

Now referring to the drawings, wherein like numerals refer to like parts, FIG. 1 illustrates a perspective view of a hose connector template 1 in an embodiment of the present invention. The hose connector template 1 may have a frame 10 that may attach to a ring 12 disposed on one end of the frame 10. The frame 10 may include a pair of arms 14,16 that may be attached together and reinforced via crossbars 18a,18b and 20a,20b. The arms 14,16 may further include joints 22,24 for attaching the template 1 to a bar 102 that may be disposed on a railway structure (as shown in FIG. 4). The ring 12 may be attached to the frame 10 via ball joint connections 26,28 thereby allowing the ring 12 to be pivotable or otherwise movable with respect to the frame 10.

Figure 6:
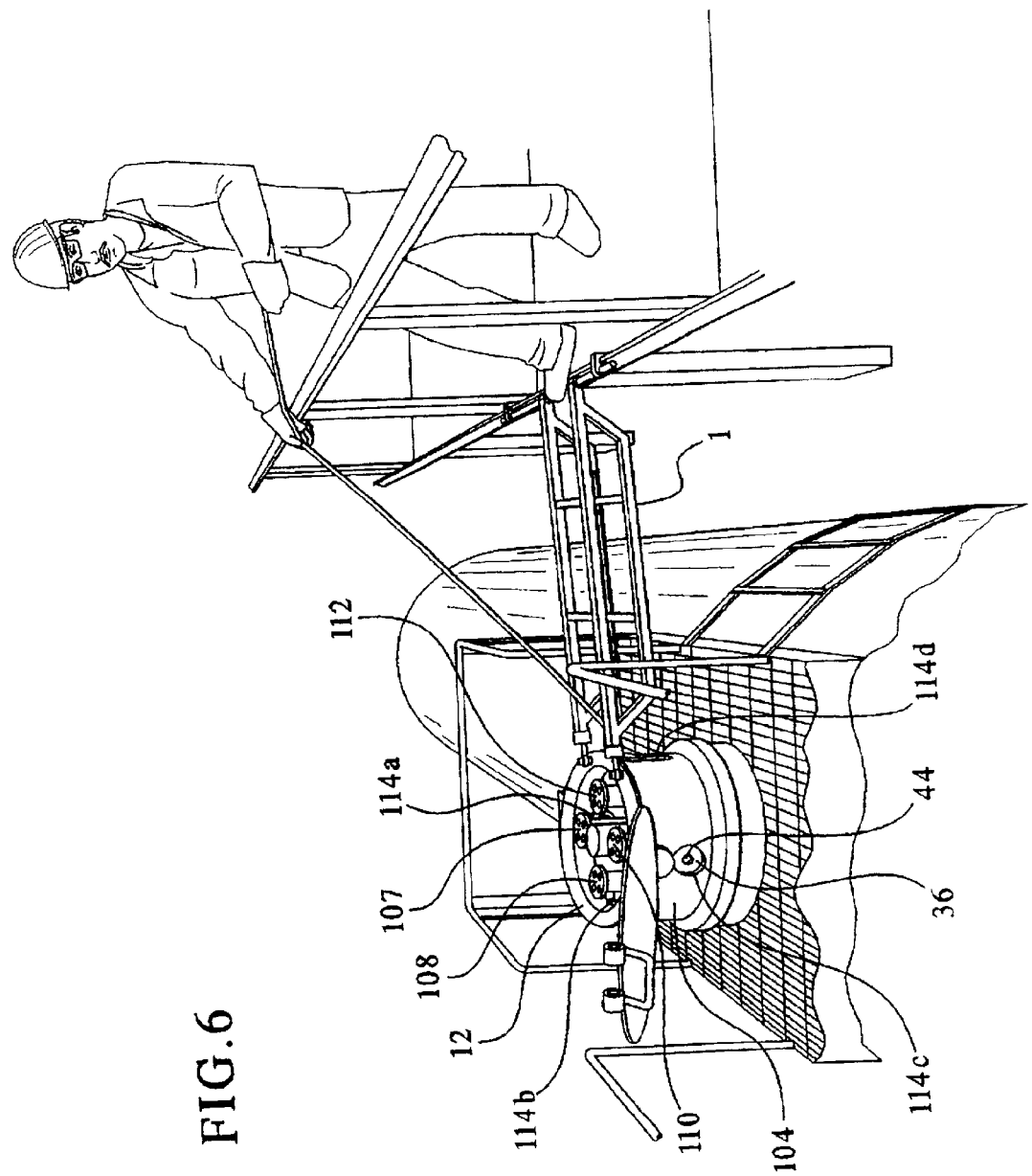
FIG. 6 illustrates a perspective view of the hose connector template disposed on a bonnet of a rail tank car.

The ring 12 may include a planar circular portion 30 having a plurality of flanges 32, 34, 36 and 38 disposed thereunder. The flanges may be welded to the planar circular portion, or otherwise integrally attached to the planar circular portion in any manner apparent to one having ordinary skill in the art. The flanges 32–38 may have apertures 40, 42, 44 and 46, respectively, disposed therein. As shown below with respect to FIG. 6, the flanges may be inserted into the bonnet of the rail tank car, after the protective cover of the bonnet has been removed or opened. The apertures 40–46 may then line up with valve ports 114a–114d (as shown in FIG. 6) that may be disposed in the side of the bonnet. Specifically, the apertures 40–46 may be differently sized to restrict the access of hoses and/or nozzles into the valve ports 114. The apertures 40–46 may prevent hoses and/or nozzles from being improperly attached to the valves contained within the bonnet of the rail tank car.

The ring 12 may further have handles 48 so that the ring may be moved or otherwise positioned by an individual when the hose connector template is being utilized. Moreover, a locking bar 50 may be attached to the frame 10 to engage an aperture (not shown) in the flange 38. The locking bar may lock onto the ring 12 to stabilize the ring 12 when being manipulated or when not in use.

Figure 5:
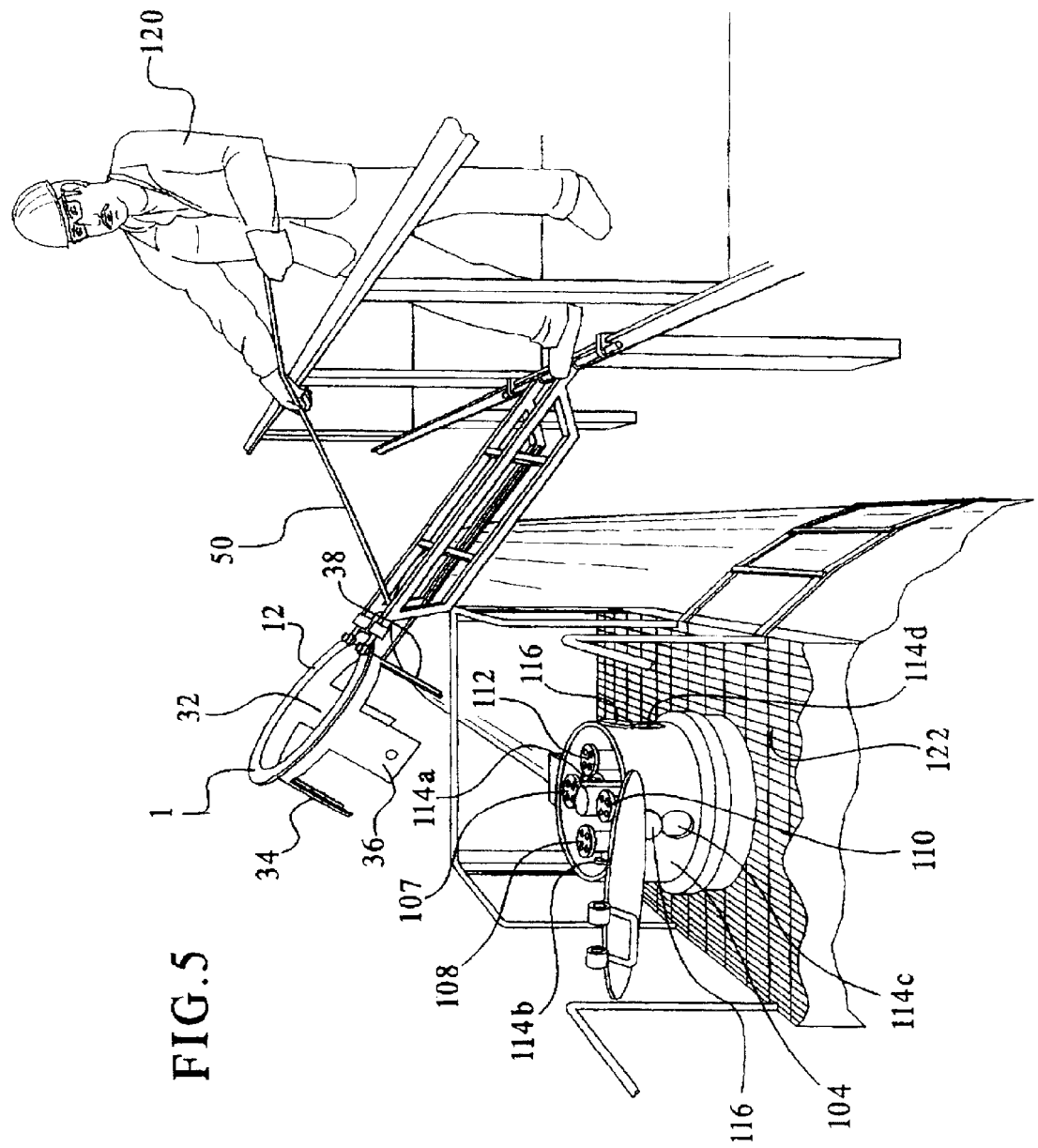
FIG. 5 illustrates a perspective view of the hose connector template being disposed on the railcar and being pivoted to fit into the bonnet of the railcar.

A chain 52 may be disposed on the frame 10 for raising and/or lowering the hose connector template 1 (as shown in FIG. 5). Of course, any other means may be utilized to raise and/or lower the hose connector template 1 onto or off of a rail tank car. In addition, a locking chain 54 may be disposed on the frame 10 for locking the hose connector template 1 in an upright position, as shown below with respect to FIG. 4. The chain 54 may be attached to a railing 100 when not in use to ensure that the template will not fall from the railing 100.

FIG. 2 shows the hose connector template 1 extended via extenders 60, 62 that may be disposed within the arms 14,16 respectively. Compression fittings 64,66 may be tightened or loosened on the arms 14,16 so that the extenders 60,62 may be extended from the arms 14,16. Moreover, the compression fittings 64,66 may be utilized to lock the extenders 60,62 in an extended position. This may allow the ring 12 to be locked into place after the ring 12 has been positioned to engage the bonnet on the rail tank car. Moreover, the locking bar 50 is unlocked from the ring 12 when the ring 12 is extended via the loosening of the compression fittings 64,66.

Figure 3:
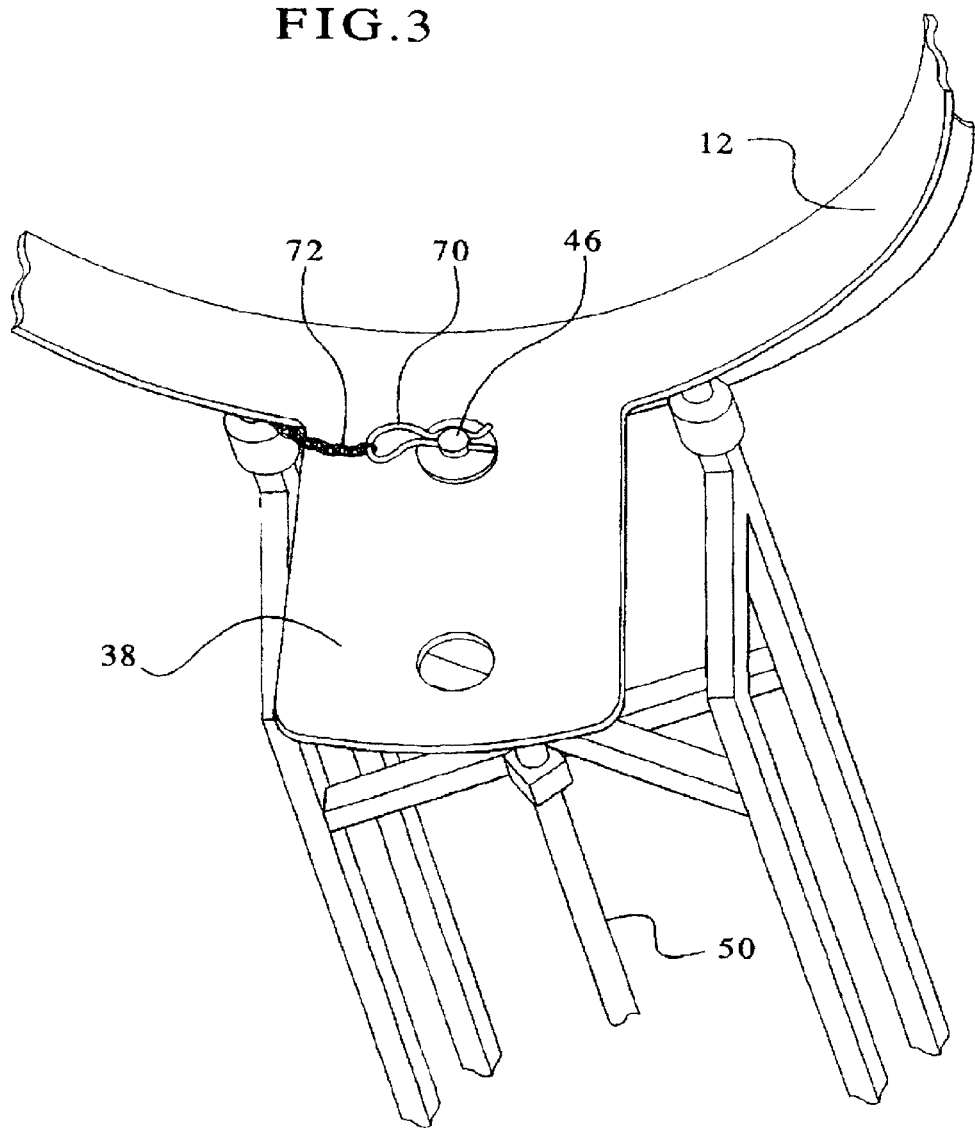
FIG. 3 illustrates a partial perspective view of a flange on the hose connector template in an embodiment of the present invention.

FIG. 3 shows a partial perspective view of the inside of the ring 12 showing the locking bar 50 engaged to the ring 12 through the aperture (not shown) in the flange 38. The locking bar 50 may engage the aperture in the flange 38 and may be clipped in the aperture in the flange 38 via a hitch pin clip 70 that may be attached to a chain 72 that may extend from the locking bar 50. The hitch pin clip 70 may be disposed within an end 46 of the locking bar 50 that may extend through the aperture (not shown) in the flange 38. The hitch pin clip 70 may therefore lock the locking bar 50 to the flange 38 when the template is not being used to keep the ring 12 from extending from the frame 10 or to otherwise keep the ring from pivotting. Of course, any type of fastening means may be utilized to lock the locking bar 50 to the ring 12. Moreover, any mechanism may be utilized to restrict the movement of the ring 12 from the arms 14,16.

Now referring to FIG. 4, the hose connector template 1 is shown attached to a walkway 101 via the joints 22,24. A bar 102 may extend through the joints 22,24 and may be attached to the walkway 101 via connecting means 103. The joints 22,24, therefore, may provide a pivot point for the hose connector template 1 so that the hose connector template 1 may be raised and lowered via the chain 52 about the pivot point from an upright position toward a bonnet 104 that may be disposed on a rail tank car 106. A plurality of valves 107, 108, 110 and 112 may be disposed within the bonnet 104 for attaching hoses thereto via nozzles so that material can be added to the rail tank car 106 or removed therefrom. The valves 107, 108, 110, and 112 may be positioned within the bonnet 104 to align with a plurality of ports 114a, 114b, 114c, and 114d that may be disposed in the side of the bonnet 104. The ports may have covers 116 that may be raised to gain access to the ports 114. The template 1 may be locked to the railing 100 via the chain 54. When a user wishes to utilized the template 1, the chain 54 may be detached from the railing 100 and the template may be lowered from the railing 100, as shown in FIG. 5.

FIG. 5 illustrates an individual 120 lowering the hose connector template 1 onto the bonnet 104. The individual may use the chain 50 to lower the hose connector template 1 toward the rail tank car 106 to the bonnet 104. Another individual (not shown) may be positioned on or near the bonnet 104 on a platform 122 and may receive the template 1 to position the ring 12 over the bonnet 104 so that the flanges 32–38 may be inserted into the interior of the bonnet. The apertures 40, 42, 44, and 46 (shown in FIGS. 1,2) may then align with the ports 114a, 114b, 114c, and 114d, respectively, that may be disposed in the side of the bonnet 104. The hose connector template 1 may be pivoted at the joints 22,24 on the bar 102 so that the hose connector template is aligned with the bonnet 104.

The ring 12 may be extended via the arms 60,62 by loosening the compression fittings 64,66. For example, the compression fittings 64,66 may be rotated so that the compression fittings "unlock" the extenders 60,62 from the frame 10. An individual (not shown) that may be positioned on the platform 122 may loosen the compression fittings 64,66 and extend the extenders 60,62 so that the ring 12 and the flanges 32–38 fit over and inside the bonnet 104. Moreover, the template 1 may be slidably mounted to the bar 102 via the joints 22,24 so that an individual may translate the hose connector template 1 to precisely align the hose connector template 1 with the bonnet 104. Further, the ball joint connectors 26,28 may allow the ring 12 to pivot or otherwise move so that the ring 12 may precisely align with the bonnet 104 such that the ring 12 may sit upon the top of the bonnet 104 and the flanges 32–38 may be inserted into the bonnet 104. Moreover, each of the apertures 40–46 may be differently sized to restrict access to the valves 107, 108, 110, and 112 through the ports 114a, 114b, 114c, and 114d, respectively.

FIG. 6 illustrates the hose connector template 1 lowered so that the ring 12 and the flanges 32–38 fit within the bonnet 104. The flanges 32–38 may be placed inside the bonnet 104 so that the flanges 32–38 may cover the ports 114a–114d. The apertures 40–46 that may be disposed within the flanges 32—38, respectively, may, therefore, provide a point of entry through the ports 114a–114d. In addition, as noted above, the apertures 40–46 may be differently sized so that only certain-sized nozzles, hoses, pipes, or any other connecting means may be allowed to enter the bonnet 104 through the ports 114a–114d to gain access to the valves 107, 108, 110, and 112 that may disposed within the bonnet 104. Alternatively, the flanges 32–38 may be color-coded, or otherwise marked or coded, so that a user of the template 1 will know which size nozzle or hose to attach to each valve 107, 108, 110 and/or 112 within the bonnet 104.

In a preferred embodiment of the present invention, the valves 107, 110 may be eduction valves, or liquid valves, and may accept a plurality of nozzle-types or sizes and/or hoses that may attach to the valves 107,110. The valves 107,110 may be connected to pipes (not shown) that may run through the rail tank car to the bottom of the rail tank car 106, and may be utilized to add or remove liquid commodities to or from the rail tank car 106. Many materials that may be gases at standard temperature and pressure may be stored within the rail tank cars under pressure. Therefore, these materials may be liquids within the rail tank car. Further the valves 108,112 may be vapor valves and may be connected to pipes (not shown) that may be only partially disposed within the rail tank car, so as to have access to the headspace within the railcar. The headspace may likely contain vapors of the material that may be stored within the railcar.

The hose connector template 1 may preferably be utilized with a steam or heated nitrogen cleaning system. For example, the railcar cleaning system may utilize at least one hose that may be connected with a heated nitrogen gas supply. Further, a second hose may be connected with a vacuum pump, and may then be connected with a reaction tank or a flare tower for disposing of the material that may be stored and/or transported within the railcar. Alternatively, the second hose may be connected directly with a flare tower or a reaction tank and may not be connected with a vacuum pump. The heated nitrogen supply may be attached to the railcar via any of the valves 107, 108, 110, and 112. Preferably, the heated nitrogen supply may be connected with one or more of the eduction valves 107,110 to flow through the railcar from the bottom of the railcar to bring the commodity within the railcar to the vapor phase. Further, the vacuum line may be attached to the railcar via any of the nozzles 107, 108, 110, and 112, but preferably may be connected with one or more of the vapor valves 108,112 contained within the bonnet. This may allow the vacuum to draw off the vapors that may be contained within the headspace of the railcar.

The valves 107, 108, 110, and 112 may be able to attach to nozzles of any size, as may be apparent to one having ordinary skill in the art. Typically, the valves 107, 108, 110, and 112 may receive nozzles that may be about 1 inch or 1¼ inch in size. For the cleaning system described above, the steam or heated nitrogen gas lines may have nozzles that may be about 1 inch in size. Moreover, the vacuum lines may have nozzles that may be about 1¼ inches in size. Therefore, the apertures 40–46 that may be disposed in the flanges 32–38, respectively, may be differently sized so as to allow the nozzles of particular sizes to be disposed therethrough to attach to the respective valves 107, 108, 110, and 112. Preferably, the apertures 40, 44, generally corresponding to the eduction valves 107,110, respectively, may be about 1 inch in size to allow only the steam or heated nitrogen lines to be disposed therein, since only the steam or heated nitrogen line nozzles will fit through the apertures 40, 44. In addition, the apertures 42,46, generally corresponding to the vapor valves 108,112, may be about 1¼ inches in size thereby allowing either the nozzles from the steam or heated nitrogen lines or the vacuum lines to be disposed therethrough. Therefore, the vacuum line may only be connected to the vapor valves, while the steam or heated nitrogen lines may be attached to either the eduction valves or the vapor valves. This may ensure that the vacuum line or lines are not attached to the eduction valves, thereby ensuring that the vacuum lines do not remove any liquid from the railcar into the vacuum pump thereby causing damage to the vacuum pump.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. An apparatus for connecting hoses to valves contained within a bonnet, wherein the bonnet is attached to a railcar, the apparatus comprising:

a template comprising a plurality of apertures wherein the apertures have sizes to restrict the attachment of hoses to the valves on the railcar wherein the template fits with the bonnet attached to the railcar and further wherein the bonnet has a plurality of valve ports wherein at least one of the apertures within the template aligns with at least one of the valve ports within the bonnet to restrict the attachment of at least one hose to at least one valve contained within the bonnet.

2. The apparatus according to claim 1 further comprising:

a frame pivotally attached to a structure wherein the template is connected to the frame.

3. The apparatus according to claim 1 wherein the template comprises a ring having flanges wherein the apertures are disposed in the flanges.

4. The apparatus according to claim 2 further comprising:

an extender connecting the frame to the template wherein the extender allows the template to move away from the frame.

5. The apparatus according to claim 4 wherein the frame has at least one arm and further wherein the extender may be moveably connected to the arm of the frame.

6. The apparatus according to claim 5 wherein the extender is connected to the arm of the frame via a compression fitting that tightens around the extender thereby restricting the movement of the extender when tightened.

7. The apparatus according to claim 1 wherein at least one of the apertures is differently sized from the other apertures.

8. The apparatus according to claim 1 wherein the valves are contained within the bonnet on the railcar and further wherein the template fits within the bonnet.

9. The apparatus according to claim 8 wherein the bonnet comprises a plurality of ports and further wherein the apertures in the template restrict access to the ports on the bonnet.

10. The apparatus according to claim 1 wherein at least two of the apertures in the template are differently sized.

11. The apparatus according to claim 2 wherein the frame is pivotally attached to the structure via rotatable joints.

12. The apparatus according to claim 2 further comprising:

a locking bar attached to the frame wherein the locking bar connects to the template and restricts movement of the template.

13. The apparatus according to claim 2 wherein the frame is pivotally connected to the structure and further wherein the frame translates along the structure.

14. The apparatus according to claim 1 further comprising:

means for lowering the template onto the bonnet of the rail car.

15. The apparatus according to claim 1 wherein a first aperture is a first size and a second aperture is a second size that is different from the first size.

16. The apparatus according to claim 1 wherein at least one aperture is sized to receive a first nozzle on one of the hoses that is about 1 inch in diameter and a second aperture is sized to receive a second nozzle on another of the hoses that is about 1 ¼ inches in diameter.

17. The apparatus according to claim 8 wherein the bonnet comprises a plurality of types of valves.

18. The apparatus according to claim 8 wherein the bonnet comprises at least one eduction valve and at least one vapor valve.

19. The apparatus according to claim 18 wherein a first size restricts access through a first port to the eduction valve and further wherein a second aperture of a second size restricts access through a second port to the vapor valve.

20. An apparatus for connecting hoses to valves on a railcar comprising:
   a template comprising a plurality of apertures wherein the apertures have sizes to restrict the attachment of hoses to the valves on the railcar; and
   an extender connecting the frame to the template wherein the extender allows the template to move away from the frame wherein the frame has at least one arm and further wherein the extender is moveably connected to the arm of the frame.

21. The apparatus according to claim 20 wherein the extender is connected to the arm of the frame via a compression fitting that tightens around the extender thereby restricting the movement of the extender when tightened.

22. An apparatus for connecting hoses to valves on a railcar comprising:
   a template comprising a plurality of apertures wherein the apertures have sizes to restrict the attachment of hoses to the valves on the railcar;
   a frame pivotally attached to a structure wherein the template is connected to the frame; and
   a locking bar attached to the frame wherein the locking bar connects to the template and restricts the movement of the template.

23. An apparatus for connecting hoses to valves on a railcar comprising:
   a template comprising a plurality of apertures wherein the apertures have sizes to restrict the attachment of hoses to the valves on the railcar wherein the template fits with a bonnet attached to the railcar having the valves contained therein; and
   a frame pivotally attached to a structure wherein the template is connected to the frame;
   an extender connecting the frame to the template wherein the extender allows the template to move away from the frame,
   wherein the frame has at least one arm and further wherein the extender may be moveably connected to the arm of the frame.

24. The apparatus according to claim 23 wherein the extender is connected to the arm of the frame via a compression fitting that may tighten around the extender thereby restricting the movement of the extender when tightened.

25. An apparatus for connecting hoses to valves on a railcar comprising:
   a template comprising a plurality of apertures wherein the apertures have sizes to restrict the attachment of hoses to the valves on the railcar wherein the template fits with a bonnet attached to the railcar having the valves contained therein;
   a frame pivotally attached to a structure wherein the template is connected to the frame; and
   a locking bar attached to the frame wherein the locking bar connects to the template and restricts movement of the template.

* * * * *